United States Patent
Reed et al.

(10) Patent No.: US 9,315,175 B1
(45) Date of Patent: Apr. 19, 2016

(54) AUTOMATIC BRAKING OVERRIDE SYSTEM

(71) Applicant: FORD GLOBAL TECHNOLOGIES, LLC, Dearborn, MI (US)

(72) Inventors: Eric L. Reed, Livonia, MI (US); Mark Alan Shehan, Ypsilanti, MI (US); Edgardo O. Abinoja, Novi, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 14/509,536

(22) Filed: Oct. 8, 2014

(51) Int. Cl.
  *G06F 7/70* (2006.01)
  *B60T 7/22* (2006.01)
  *B60T 8/171* (2006.01)

(52) U.S. Cl.
  CPC .. *B60T 7/22* (2013.01); *B60T 8/171* (2013.01)

(58) Field of Classification Search
  CPC .......... G01S 15/93; G01S 15/931; G08G 1/16
  USPC ............... 701/70, 300, 301, 96; 340/435, 436
  See application file for complete search history.

(56) References Cited

U.S. PATENT DOCUMENTS

| | | | |
|---|---|---|---|
| 5,574,426 A | 11/1996 | Shisgal et al. | |
| 7,857,339 B2 | 12/2010 | Paulson | |
| 2013/0314503 A1 | 11/2013 | Nix et al. | |
| 2014/0156157 A1 | 6/2014 | Johnson et al. | |
| 2014/0288818 A1* | 9/2014 | Kiehne | 701/301 |
| 2014/0303866 A1* | 10/2014 | Roblin et al. | 701/70 |
| 2014/0309884 A1* | 10/2014 | Wolf | 701/41 |

\* cited by examiner

*Primary Examiner* — Luke Huynh
(74) *Attorney, Agent, or Firm* — Frank A. MacKenzie; Brooks Kushman P.C.

(57) ABSTRACT

A vehicle includes a vehicle-driver interface and an automated braking system. The automated braking system is configured to automatically apply vehicle brakes in response to a detected rearward object and the vehicle being in REVERSE. The automated braking system is additionally configured to release the brakes in response to a driver input at the vehicle-driver interface when a distance from the vehicle to the rearward object exceeds a calibratable threshold. The automated braking system is further configured to apply the brakes in response to the vehicle traveling a predefined distance after the driver input.

14 Claims, 3 Drawing Sheets

AUTOMATIC BRAKING OVERRIDE SYSTEM

TECHNICAL FIELD

The present disclosure relates to an automated braking system for a vehicle and associated override system and interface.

BACKGROUND

Vehicles may be equipped with reverse assist systems used to help prevent a driver from backing into an object located aft of the vehicle. Such systems may sense the presence of an object aft of the vehicle and take an action in response. As an example, an auditory or visual alarm may be activated to alert the driver of the presence of the object aft of the vehicle. Some vehicles may also be configured to automatically apply vehicle brakes when an object is sensed aft of the vehicle.

SUMMARY

A vehicle according to the present disclosure includes a vehicle-driver interface and an automated braking system. The automated braking system is configured to automatically apply vehicle brakes in response to a detected rearward object and the vehicle being in REVERSE. The automated braking system is additionally configured to release the brakes in response to a driver input at the vehicle-driver interface when a distance from the vehicle to the rearward object exceeds a calibratable threshold. The automated braking system is further configured to apply the brakes in response to the vehicle traveling a predefined distance after the driver input.

In some embodiments, the vehicle additionally includes a video camera coupled to a rearward portion of the vehicle and a driver-accessible video monitor configured to display video captured by the video camera. The video monitor may be further configured to display a distance marker indicating a distance from the rearward portion of the vehicle to an object in a rearward path of the vehicle. The vehicle-driver interface may include a multi-function touchscreen display. In some embodiments, the automated braking system is further configured to discontinue automated application of the vehicle brakes in response to a second driver input.

A method of controlling a vehicle according to the present disclosure includes automatically applying vehicle brakes in response to the vehicle being in REVERSE when a distance to a detected rearward object is less than a first threshold. The method additionally includes releasing the brakes in response to a driver input when the brakes are automatically applied and the distance to the detected rearward object is greater than a second threshold. The method further includes automatically applying the brakes in response to vehicle wheels traveling a threshold rotation after the releasing.

In one embodiment, the method additionally includes automatically applying the brakes in response to a second driver input. In some embodiments, the method additionally includes releasing the brakes in response to a third driver input exceeding an associated temporal threshold, and automatically applying the vehicle brakes in response to the third driver input ending. In such embodiments, the vehicle may include a vehicle-driver interface having a button. The first driver input corresponds to a driver activation of the button not exceeding the temporal threshold, and the third driver input corresponds to a driver activation of the button exceeding the temporal threshold. Additionally, in such embodiments the vehicle-driver interface may include a multi-function touch display and the button is a touch-sensitive region on the display.

A vehicle according to the present disclosure includes traction wheels, vehicle brakes configured to provide braking torque to the wheels, a camera configured to record a region behind the vehicle, a multi-function touch display configured to present images captured by the camera and receive driver input, and a controller. The controller is provided with an automated braking algorithm for automatically controlling vehicle brakes. The controller is configured to automatically apply the brakes according to the braking algorithm in response to an object being detected behind the vehicle when a distance to the object is less than a first calibratable threshold. The controller is additionally configured to override the braking algorithm and release the vehicle brakes in response to a first driver input to the multi-function touch display when the distance to the object is greater than a second calibratable threshold. The controller is further configured to terminate the override and automatically apply the brakes in response to the vehicle travelling a length exceeding a third calibratable threshold with the braking algorithm overridden.

In some embodiments, the controller is further configured to, in response to a second driver input to the multi-function touch display, where the second driver input has a temporal duration exceeding a fourth calibratable threshold, override the parking algorithm and release the vehicle brakes while the second driver input persists. In such embodiments, the controller is further configured to terminate the override and automatically apply the vehicle brakes in response to the second driver input ceasing. In some embodiments, the multi-function touch display is further configured to display a distance marker indicating the distance to the object.

Embodiments according to the present disclosure provide a number of advantages. For example, the present disclosure provides an automated braking system and method with various override features enabling a driver to back more closely to a rearward object than the default automated braking system logic permits. In addition, systems and methods according to the present disclosure enable a driver to do so without colliding with the rearward object The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Known reverse assist systems may be configured to produce an auditory alarm or a visual alert in response to a detected object rearward of the vehicle while the vehicle is in reverse. Such systems may not actively prevent a driver from colliding with an object aft of the vehicle. Other systems may be configured to engage vehicle brakes in response to an object detected aft of the vehicle. However, in some driving situations a driver may desire to reverse more closely to an aft object than such systems permit.

Figure 1A:
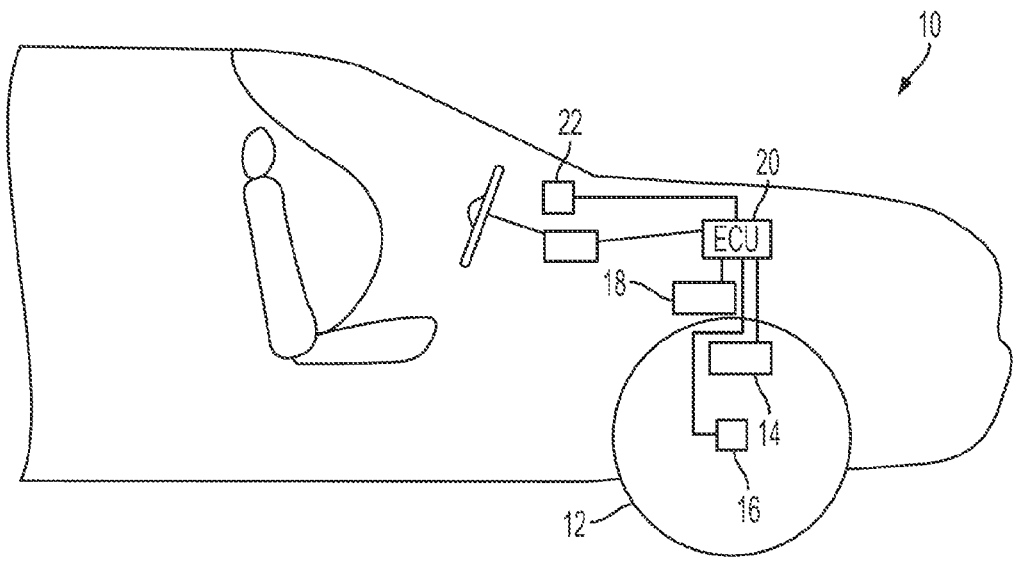
FIGS. 1A and 1B is a schematic illustration of a vehicle having an automated braking system.

Referring now to FIG. 1A, a vehicle 10 according to the present disclosure is illustrated. The vehicle 10 includes vehicle traction wheels 12. The vehicle 10 additionally includes wheel brakes 14 configured to provide braking torque to the wheels 12. In a preferred embodiment, the wheel brakes 14 include friction brakes configured to selectively apply braking torque in response to signals from an antilock braking system (ABS). In some embodiments, the wheel brakes 14 may include an electric machine configured to apply regenerative braking torque. The vehicle additionally includes wheel speed sensors 16 configured to detect a rotational speed of the wheels 12. The vehicle additionally has a transmission 18 configured to select from among a plurality of gear ratios between an engine and vehicle wheels. The transmission 18 includes a REVERSE gear. The vehicle 10 additionally includes at least one electronic control unit (ECU) 20. The ECU 20 may collectively include multiple controllers, such as an ABS controller, powertrain control unit, and/or other controllers. The wheel brakes 14, wheel speed sensors 16, and transmission 18 are in communication with or under the control of the ECU 20. Other known sensors may also be provided.

The vehicle 10 additionally includes a human machine interface (HMI) 22. In a preferred embodiment, the HMI 22 includes a touchscreen video display, as will be discussed below with respect to FIG. 2. In other embodiments, the HMI 22 may include a visual display in conjunction with physical driver-activated buttons. The HMI 22 is in communication with the ECU 20 and is configured to display alerts, video, and/or transmit other messages or signals to a vehicle driver.

Figure 1B:
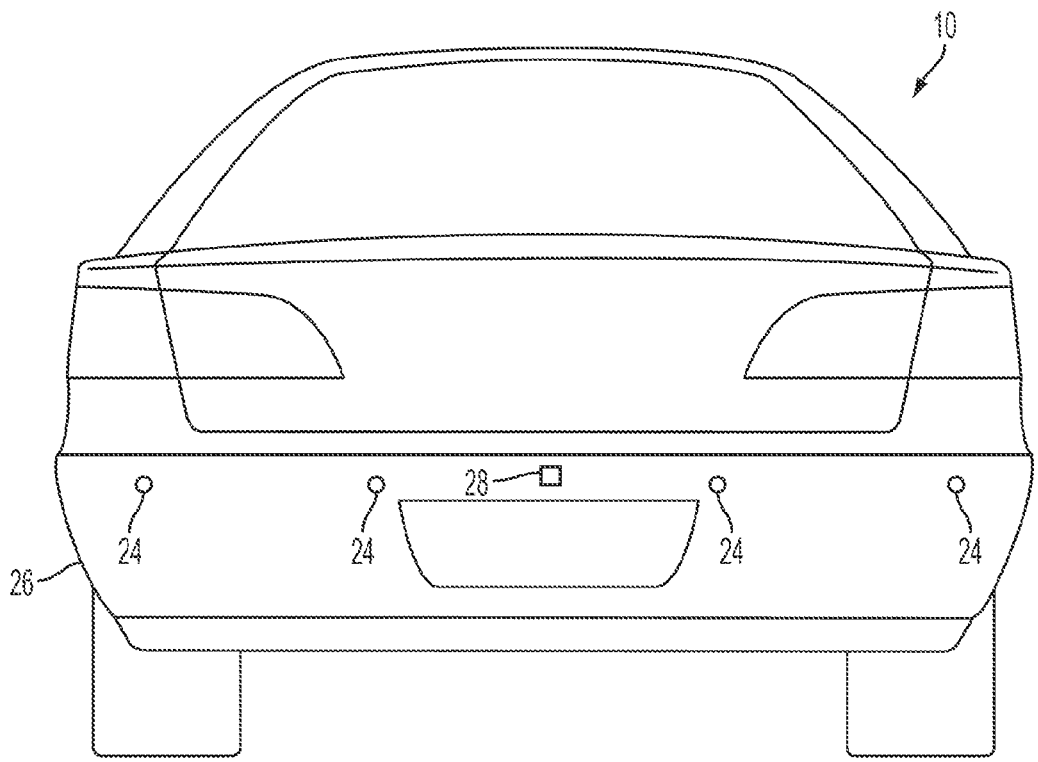

Referring now to FIG. 1B, the vehicle 10 includes a plurality of sensors 24 arranged on a rear portion 26 of the car. In a preferred embodiment, the sensors 24 are ultrasonic sensors, and the rear portion 26 is the rear bumper. The sensors 24 are also in communication with the ECU 20. The sensors 24 are configured to detect an object rearward of the vehicle 10 and transmit signals indicating the presence of the object rearward of the vehicle to the ECU 20. The vehicle 10 additionally includes a backup camera 28. The backup camera 28 is configured to capture video of a region rearward of the vehicle and transmit the captured video to the ECU 20. In embodiments where the HMI 22 includes a video display, video captured by the backup camera 28 may be shown on the HMI 22 when the transmission 18 is placed in REVERSE.

Other embodiments may be provided with other sensors, such as RADAR, LIDAR, or other systems for detecting a location and proximity of a rearward object. In some embodiments, optical recognition software may be used in conjunction with a backup camera to detect the presence of a rearward object.

Figure 2:
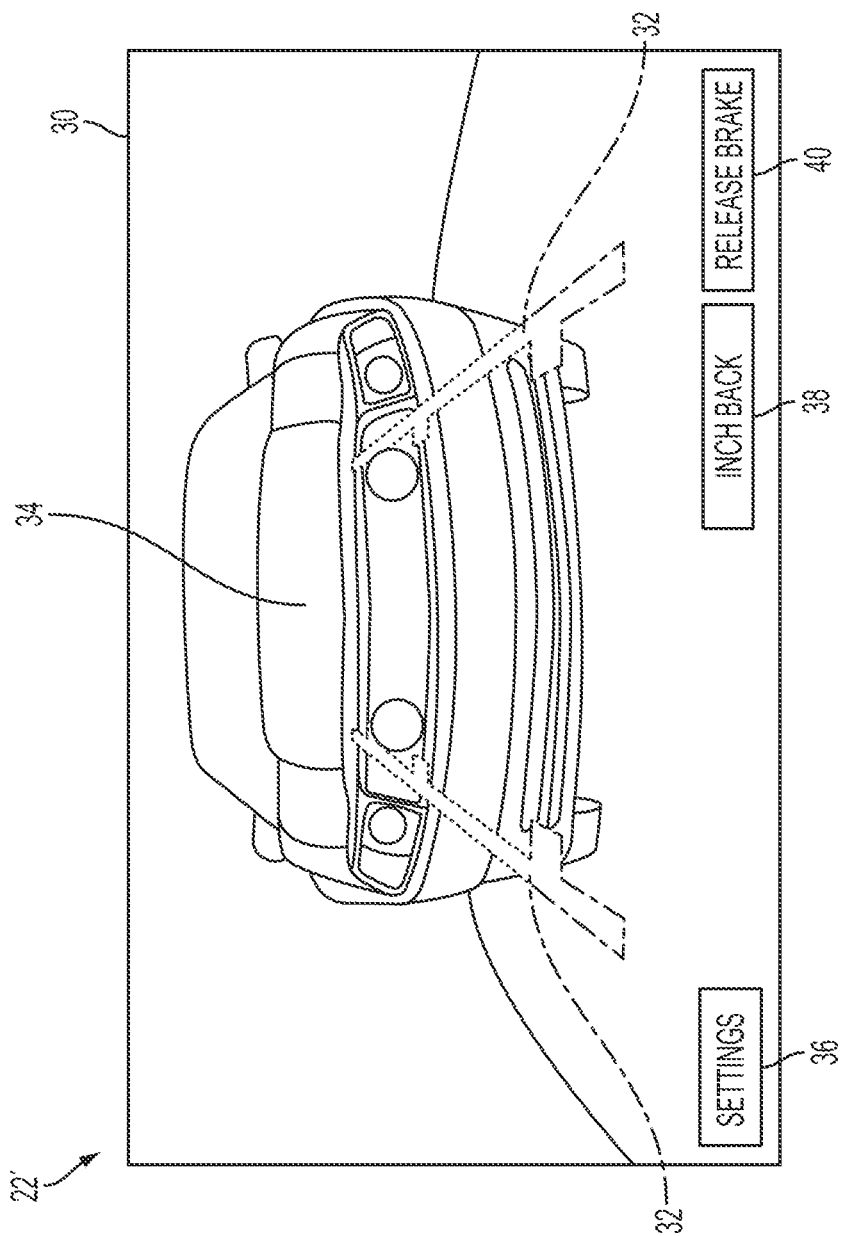
FIG. 2 is an exemplary driver interface as may be used with an automated braking system.

Referring now to FIG. 2, an exemplary HMI 22' according to the present disclosure is shown. The HMI 22' includes a touchscreen video display 30. The display 30 is preferably configured to show video from an aft-facing camera, which may be arranged similarly to the backup camera 28 illustrated in FIG. 1B. The display 30 also includes distance indicators 32. The distance indicators 32 include markings representing a distance between a rear portion of the vehicle and a rearward object 34 (in this case, a second vehicle positioned behind the vehicle 10). A driver may use the distance indicators 32 to judge how far the vehicle may travel in REVERSE without colliding with the rearward object 34. In other embodiments, the distance indicators 32 may be represented by numerals or other appropriate signal indicative of the distance to the rearward object 34.

The HMI 22' additionally includes a plurality of control regions, such as touch-sensitive regions or buttons. In the embodiment illustrated in FIG. 2, the HMI 22' includes a "Settings" button 36 by which a user may access various configurations options. The HMI 22' further includes an "Inch Back" button 38 and a "Release Brake" button 40, the functions of which will be described below with respect to FIG. 3. The HMI 22' is configured to transmit signals to a controller, which may be similar to the ECU 20, indicative of user inputs to the various control regions. Additional buttons or input fields may be provided to control various other aspects of the reverse assist system.

Figure 3:
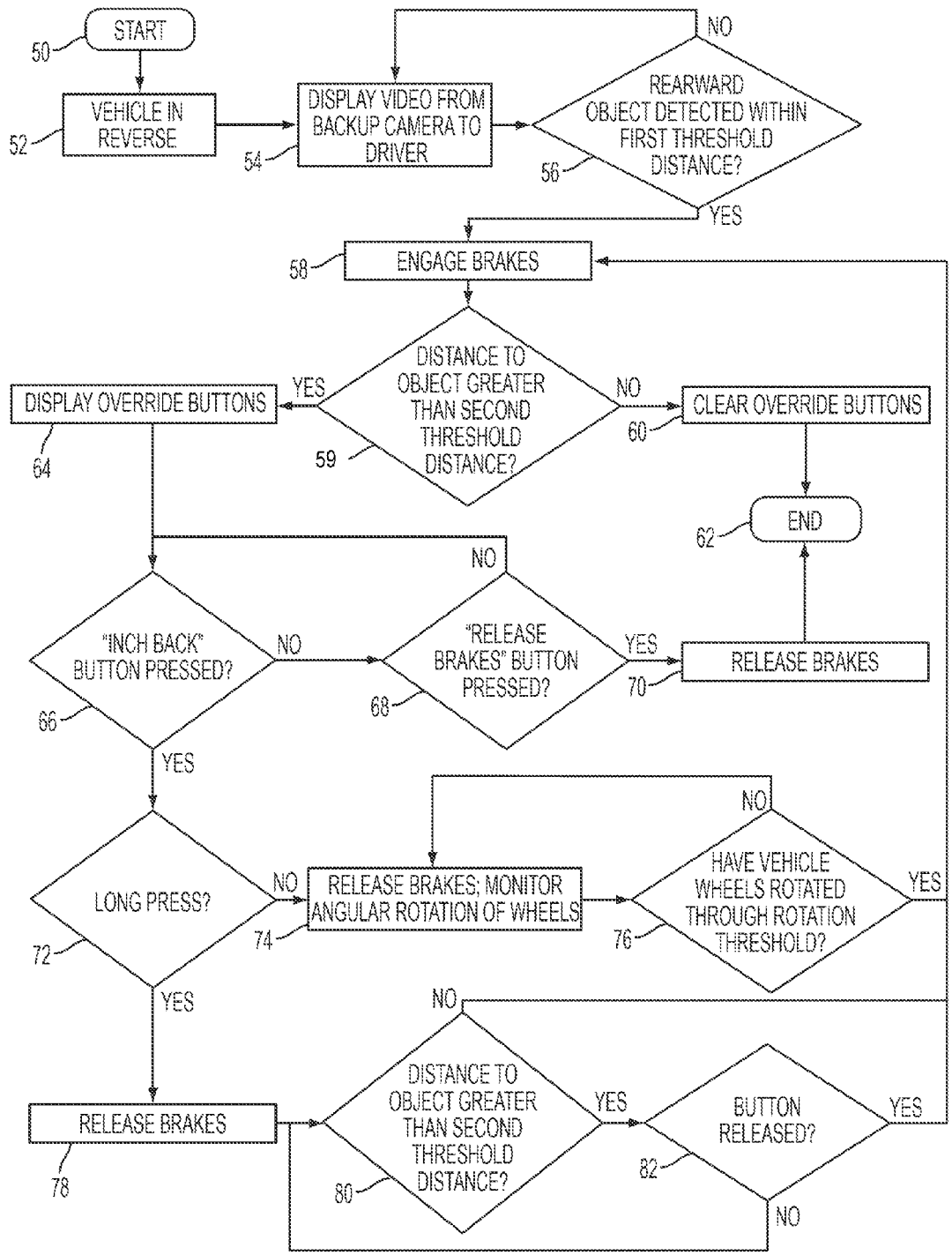
FIG. 3 illustrates a method of controlling an automated braking system in flowchart form.

Referring now to FIG. 3, a method of controlling a vehicle according to the present disclosure is illustrated in flowchart form, beginning at block 50. The vehicle is in a REVERSE gear, as illustrated at block 52. Video from a backup camera is displayed to a driver, as illustrated at block 54. A determination is made of whether a rearward object is detected within a first threshold distance, as illustrated at operation 56. In a preferred embodiment, the first threshold distance is between 0.25 and 0.5 meters. Other distances may, of course, be used. This determination may be made based on signals from sensors arranged similarly to the sensors 24 illustrated in FIG. 1B. If no, then control returns to block 54. If yes, then vehicle brakes are automatically engaged, as illustrated at block 58. This may be performed, for example, by commanding an ABS system to engage friction brakes. Collectively, steps 52 through 58 may define a nominal automated braking algorithm.

After the brakes are automatically engaged at block 58, a determination is made of whether the distance to the rearward object is greater than a second threshold distance, as illustrated at operation 59. In a preferred embodiment, the second threshold distance is approximately 5 centimeters. If no, i.e. the distance to the rearward object is less than or equal to the second threshold distance, then override buttons (if active) are cleared, as illustrated at block 60. The algorithm ends at block 62. The method thus provides a minimum distance within which the driver may not travel further in REVERSE, avoiding a collision between the vehicle and the rearward object.

Returning to operation 59, if the distance to the rearward object is greater than the second threshold distance, then override buttons are displayed, as illustrated at block 64. This is preferable performed by displaying touch icons on a touchscreen display arranged similarly to HMI 22'. In this embodiment, the override buttons include an "Inch Back" button and a "Release Brakes" button, though other additional buttons and corresponding functions may be provided in other embodiments. A determination is then made of whether the "Inch Back" button is pressed, as illustrated at operation 66. If no, then a determination is made of whether a "Release Brakes" button is pressed, as illustrated at operation 68. If no, then control returns to operation 66. The algorithm thus waits for a driver input while the brakes are engaged. If a determination is made at operation 68 that the "Release Brakes" button is pressed, then the brakes are released, as illustrated at block 70. The algorithm ends at block 62. The method thus terminates the automated braking algorithm in response to a driver selection of the "Release Brakes" button.

Returning to operation 66, if a determination is made that the "Inch Back" button has been activated, then a determination is made of whether the activation is a "long press", as illustrated at block 72. A temporal threshold is provided, and if a driver activation of the "Inch Back" button persists for a duration exceeding the temporal threshold, then the activation is determined to be a long press. If a driver activation of the "Inch Back" button does not persist for a duration exceeding the temporal threshold, then the activation is determined to not be a long press. As a non-limiting example, the temporal threshold may be 0.25 seconds.

If a determination is made at operation 72 that the activation of the "Inch Back" button is a short press, then the brakes are released and wheel rotation is monitored, as illustrated at bock 74. The releasing of the brakes is preferably only a partial release of the brakes resulting in a reduction in the applied braking torque, and not a full release of the brakes resulting in no braking torque being applied. The method thus provides for a partial override of the automated braking system in response to a short press of the "Inch Back" button. The angular rotation may be monitored by, for example, integrating a sensor reading from wheel speed sensors arranged similarly to the wheel speed sensors 16 illustrated in FIG. 1A. A determination is made of whether the vehicle wheels have rotated through a rotation threshold with the braking algorithm overridden, as illustrated at operation 76. The rotation threshold is calibrated based on wheel size to correspond with a desired "inch back" distance. In a preferred embodiment, the "inch back" distance is approximately equal to 3 centimeters. Other distances may, of course, be used.

If a determination is made at operation 76 that the vehicle wheels have rotated through the rotation threshold, then control returns to block 58 and the brakes are engaged. If a determination is made that the vehicle wheels have not rotated through the rotation threshold, then control returns to block 74 and the angular rotation of the wheels is monitored.

As may be seen, a short press of the "Inch Back" button results in the automated braking algorithm being overridden until the vehicle "inches" backward a calibrated distance. Subsequently the override is terminated and the brakes are applied. If the distance to the rearward object is greater than the second threshold distance, then the various override options are again available to the driver.

Returning to operation 72, if a determination is made that the driver activation of the "Inch Back" button is a long press, then the vehicle brakes are released, as illustrated at block 78. The releasing of the brakes is preferably only a partial release of the brakes resulting in a reduction in the applied braking torque, and not a full release of the brakes resulting in no braking torque being applied. The method thus provides for a partial override of the automated braking system in response to a long press of the "Inch Back" button. A determination is made of whether the distance to the rearward object remains greater than the second threshold distance, as illustrated at operation 80. If no, then control returns to block 58 and the brakes are engaged. If yes, then a determination is made of whether the "Inch Back" button is released, as illustrated at operation 82. If no, then control returns to operation 80. If yes, then control returns to block 58 and the brakes are engaged.

As may be seen, a long press of the "Inch Back" button results in the automated algorithm being overridden while the button press persists and the distance to the rearward object remains greater than the second threshold distance. If the "Inch Back" button is released or the distance to the rearward object is equal to or less than the second threshold distance, then the override is terminated and the brakes are applied. If the distance to the rearward object is greater than the second threshold distance, then the various override options are again available to the driver.

Variations on the above method are, of course, possible. As an example, in some embodiments separate "Inch Back" and "Creep Back" buttons may be provided, rather than providing a single "Inch Back" button with separate functions for long and short presses as in the above embodiment.

As may be seen, the present invention provides an automated braking system with various override features enabling a driver to back more closely to a rearward object without colliding with the rearward object.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
a vehicle-driver interface; and
an automated braking system configured to
   in response to a detected rearward object and the vehicle being in REVERSE, automatically apply vehicle brakes;
   in response to a driver input at the vehicle-driver interface and a distance from the vehicle to the rearward object exceeding a calibratable threshold, release the brakes; and
   in response to the vehicle traveling a predefined distance after the driver input, apply the brakes.
2. The vehicle of claim 1, wherein the vehicle-driver interface comprises a multi-function touchscreen display.

3. The vehicle of claim 1, further comprising a video camera coupled to a rearward portion of the vehicle and a driver-accessible video monitor configured to display video captured by the video camera.

4. The vehicle of claim 3, wherein the video monitor is further configured to display a distance marker indicating a distance from the rearward portion of the vehicle to an object in a rearward path of the vehicle.

5. The vehicle of claim 1, wherein the automated braking system is further configured to, in response to a second driver input, discontinue automated application of the vehicle brakes.

6. A method of controlling a vehicle comprising:
automatically applying vehicle brakes in response to the vehicle being in REVERSE and a distance to a detected rearward object being less than a first threshold;
releasing the brakes in response to a driver input, the brakes being automatically applied, and the distance being greater than a second threshold; and
automatically applying the brakes in response to vehicle wheels traveling a threshold rotation in REVERSE after the releasing.

7. The method of claim 6, further comprising discontinuing automatically applying the brakes in response to a second driver input.

8. The method of claim 6, further comprising releasing the brakes in response to a third driver input exceeding an associated temporal threshold and automatically applying the vehicle brakes in response to the third driver input ending.

9. The method of claim 8, wherein the vehicle includes a vehicle-driver interface having a button, the first driver input corresponds to a driver activation of the button not exceeding the temporal threshold, and the third driver input corresponds to a driver activation of the button exceeding the temporal threshold.

10. The method of claim 9, wherein the vehicle-driver interface comprises a multi-function touch display and the button is a touch-sensitive region on the display.

11. A vehicle comprising:
vehicle brakes configured to provide braking torque to vehicle traction wheels;
a camera configured to record a region behind the vehicle;
a multi-function touch display configured to present images captured by the camera and receive driver input;
a controller having an automated braking algorithm for automatically controlling vehicle brakes, the controller being configured to
automatically apply the brakes in response to an object being detected behind the vehicle, a distance to the object being less than a first calibratable threshold;
override the braking algorithm and release the vehicle brakes in response to a first driver input to the multi-function touch display and the distance to the object being greater than a second calibratable threshold; and
terminate the override and automatically apply the brakes in response to the vehicle travelling a length exceeding a third calibratable threshold with the braking algorithm overridden.

12. The vehicle of claim 11, wherein the controller is further configured to:
in response to a second driver input to the multi-function touch display, the second driver input having a temporal duration exceeding a fourth calibratable threshold, override the parking algorithm and release the vehicle brakes while the second driver input persists; and
in response to the second driver input ceasing, terminate the override and automatically apply the vehicle brakes.

13. The vehicle of claim 11, wherein the multi-function touch display is further configured to display a distance marker indicating the distance to the object.

14. The vehicle of claim 11, further comprising an ultrasonic sensor, wherein the object detected behind the vehicle is detected by the ultrasonic sensor.

* * * * *